(12) United States Patent
Zhang et al.

(10) Patent No.: US 9,507,011 B2
(45) Date of Patent: Nov. 29, 2016

(54) MAXIMUM LIKELIHOOD LOCALIZATION IN THE PRESENCE OF CHANNEL UNCERTAINTIES

(71) Applicants: Xue Zhang, Mesa, AZ (US); Cihan Tepedelenlioglu, Chandler, AZ (US); Mahesh K. Banavar, Tempe, AZ (US); Andreas Spanias, Tempe, AZ (US)

(72) Inventors: Xue Zhang, Mesa, AZ (US); Cihan Tepedelenlioglu, Chandler, AZ (US); Mahesh K. Banavar, Tempe, AZ (US); Andreas Spanias, Tempe, AZ (US)

(73) Assignee: Arizona Board of Regents, a body corporate of the State of Arizona Acting for and on behalf of Arizona State University, Scottsdale, AZ (US)

( * ) Notice: Subject to any disclaimer, the term of this patent is extended or adjusted under 35 U.S.C. 154(b) by 160 days.

(21) Appl. No.: 14/213,655

(22) Filed: Mar. 14, 2014

(65) Prior Publication Data
US 2014/0274166 A1    Sep. 18, 2014

Related U.S. Application Data

(60) Provisional application No. 61/785,577, filed on Mar. 14, 2013.

(51) Int. Cl.
*G01S 5/02* (2010.01)
*G01S 5/14* (2006.01)
*H04W 84/18* (2009.01)

(52) U.S. Cl.
CPC ............ *G01S 5/0278* (2013.01); *G01S 5/0289* (2013.01); *G01S 5/14* (2013.01); *H04W 84/18* (2013.01)

(58) Field of Classification Search
CPC ................................ H04W 64/00; H04W 4/02
USPC ............................................. 455/456.1, 457
See application file for complete search history.

(56) References Cited

U.S. PATENT DOCUMENTS

| | | | |
|---|---|---|---|
| 8,818,706 B1 * | 8/2014 | Ogale .................. | G01C 21/206 340/539.1 |
| 2010/0177681 A1 * | 7/2010 | Sahinoglu ................. | G01S 5/12 370/328 |

OTHER PUBLICATIONS

Jia et al. (A new Cramer-Rao lower bound for TOA-based localization—Nov. 16-19, 2008).*
NCBI (http://www.ncbi.nlm.nih.gov/pmc/articles/PMC3304154/—Feb. 13, 2012).*
Huang et al. (Analyzing localization errors in one-dimensional sensor networks—Aug. 23, 2011).*
Mao et al. (Localization Algorithms and Strategies for Wireless Sensor Networks—2009).*
Han et al. , "Localization Algorithms of Underwater Wireless Sensor Networks: A Survey", Feb. 2012.*
Julian et al. , "Maximum-Likelihood Based Estimation of the Nakagami m Parameter", Mar. 2001.*
Wang et al., "Estimating the Nakagami-m Fading Parameter by the Generalized Method of Moments", 2011.*
I.F.Akyildiz,W.Su,Y.Sankarasubramaniam,andCayir E., "Wireless sensor networks: a survey," Computer Networks, pp. 393-422, 2002.
G. Sun, J. Chen, W. Guo, and K.J.R. Liu, "Signal pro- cessing techniques in network-aided positioning," IEEE Signal Porcessing Magazine, 2005.

(Continued)

*Primary Examiner* — Dung Hong
(74) *Attorney, Agent, or Firm* — Bryan Cave LLP

(57) ABSTRACT

Some embodiments include a wireless sensor network system. Other embodiments of related systems and methods are also disclosed.

20 Claims, 7 Drawing Sheets

(56) References Cited

OTHER PUBLICATIONS

N. Patwari, J.N. Ash, S. Kyperountas, A.O. Hero III, R.L. Moses, and N.S. Correal, "Locating the nodes—cooperative localization in wireless sensor network," IEEE Signal Processing Magazine, vol. 22, No. 4, pp. 54-69, 2005.

N.Patwari,A.O.HeroIII,M.Perkins,N.S.Correal,and R.J. O'Dea, "Relative location estimation in wireless sensor networks," IEEE Transactions on Signal Pro- cessing, vol. 51, No. 8, pp. 2137-2148, 2003.

Y. Qi, H. Kobayashi, and H. Suda, "On time-of-arrival positioning in a multipath environmment," IEEE Trans- actions on Vehicular Technology, vol. 55, No. 5, 2006.

Y. Shen, H. Wymeersch, and M.Z. Win, "Fundamen- tal limits of wideband localization—Part II: cooperative networks," IEEE Transactions on Infromation Theory, vol. 56, No. 10, pp. 4981-5000, Oct. 2010.

T. Jia and R.M. Buehrer, "A new Cramer-Rao lower bound for TOA-based localization," IEEE Military Communications Conference, 2008.

W. Tao, "Cramer-Rao bound for localization with a pri- ori knowledge on biased range measurements," IEEE Transactions on Aerospace and Electronic Systems, vol. 48, No. 1, 2012.

P. Bergamo and G. Mazzini, "Localization in sensor networks with fading and mobility," IEEE Interna- tional Symposium on Personal, Indoor and Mobile Ra- dio Communications, 2002.

S.A. Sattarzadeh and B. Abolhassani, "TOA extraction in multipath fading channels for location estimation," IEEE International Symposium on Personal, Indoor and Mobile Radio Communications Conference, 2006.

H.L. Van Trees, Detection, estimation and modulation Theory, John Wiley and Sons, Inc., 1968.

A.N. Andrea, U. Mengali, and R. Reggiannini, "The modified cramer-rao bound and its application to syn- chronization problems," IEEE Transactions on Commu- nications, vol. 42, No. 234, pp. 1391-1399, 1994.

S. Ray, W. Lai, and I. Paschalidis, "Statistical location detection with sensor networks," IEEE Transactions on Information Theory, vol. 52, No. 6, pp. 2670-2683,2006.

R. Niu and P.K. Varshney, "Source Localization in Sensor Networks with Rayleigh Faded Signals", IEEE International Conference on Acoustics, Speech and Signal Processing (CASSP) 2007, pp. III-1229-III-1232, Apr. 2007.

X Zhang et al., "CRLB for the localization error in the presence of fading", IEEE International Conference on Acoustics, Speech and Signal Processing (ICASSP), pp. 5150-5154, May 2013.

* cited by examiner

MAXIMUM LIKELIHOOD LOCALIZATION IN THE PRESENCE OF CHANNEL UNCERTAINTIES

CROSS-REFERENCE TO RELATED APPLICATIONS

This application claims the benefit of U.S. Provisional Application No. 61/785,577, filed Mar. 14, 2013. U.S. Provisional Application No. 61/785,577 is incorporated herein by reference in its entirety.

TECHNICAL FIELD

This disclosure relates generally to wireless sensor networks, and relates more particularly to localization in wireless sensor networks.

BACKGROUND

Wireless sensor networks (WSNs) are commonly employed for many applications including for environmental protection, structural monitoring and passive localization and tracking. A large number of inexpensive sensor nodes with low size, weight and power (SWAP) can be randomly distributed across an area of interest. These nodes operate as transceivers, communicating with one another in an ad-hoc manner, and can be at unknown locations. This is with the exception of a very small number of so-called anchor nodes, which can be at known locations. In commercial applications such as water quality monitoring as well as in military applications such as gunshot detection, an accurate knowledge of the location where an event occurs can be highly beneficial to the users of the system. In many applications, measured sensor data is meaningful only when the location of sensors is accurately known.

In general, localization techniques can be classified into range-based and direction-based approaches. Common range-based approaches are time of arrival (TOA), time difference of arrival (TDOA), and received signal strength (RSS). Direction-based approaches include direction of arrival (DOA) estimation techniques implemented by employing antenna arrays at each sensor. Large aperture array (LAA) localization algorithms jointly use direction and range-based information to localize a source by forming a single large aperture array of sensors.

Despite the prevalence of fading in practice, prior techniques do not address the Cramer-Rao lower bound (CRLB) for localization under fading environments. Although some prior techniques have considered fading environments for TOA measurements, CRLB for localization error under fading environments has not been addressed.

BRIEF DESCRIPTION OF THE DRAWINGS

To facilitate further description of the embodiments, the following drawings are provided in which.

Figure 1:
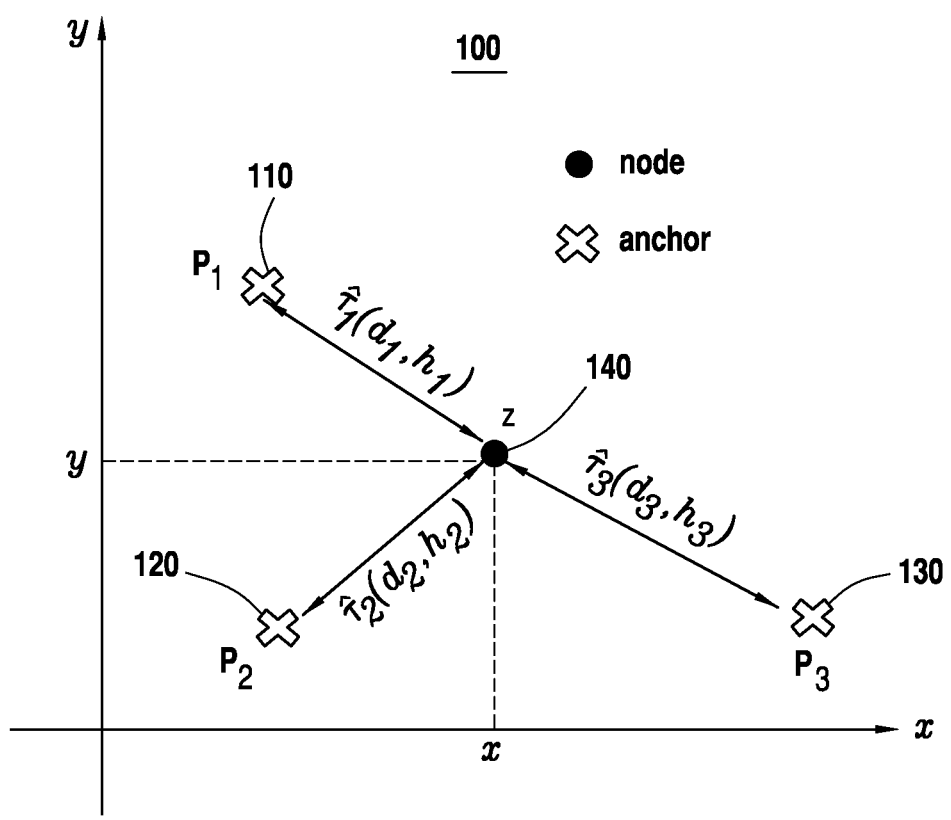
FIG. 1 illustrates a wireless sensor network system, according to an embodiment.

For simplicity and clarity of illustration, the drawing figures herein illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types. The absence of the word "removably," "removable," and the like near the word "coupled," and the like does not mean that the coupling, etc. in question is or is not removable.

DESCRIPTION OF EXAMPLES OF EMBODIMENTS

A number of embodiments include a method of localizing a sensor node device in communication with a plurality of anchor sensors each having a known location. The communication can occur over a wireless fading communication channel. The method includes transmitting a first signal from each anchor sensor of the plurality of anchor sensors to the sensor node device over the wireless fading communication channel. The method can further include receiving the first signal at the sensor node device. The method can also include transmitting a second signal from the sensor node device to each anchor sensor of the plurality of anchor sensors. The transmitting can occur over the wireless fading communication channel after receipt of the first signal. The method can further include receiving the second signal at each anchor sensor of the plurality of anchor sensors during a first time period after such anchor sensor transmitted the first signal. The method can also include determining for each anchor sensor of the plurality of anchor sensors a time-of-arrival measurement based at least in part upon the first time period. The method can further include determining a maximum likelihood estimation for the sensor node device. The method can also include displaying at a computer video display a location estimation of the sensor node device based at least in part on the maximum likelihood estimation.

Further embodiments include a method. The method can be implemented to localize a sensor node device configured to communicate with a plurality of anchor sensors each having a known location. The communication can occur over a wireless fading communication channel. The method can include transmitting a first signal from at least one anchor sensor of the plurality of anchor sensors to the sensor node device over the wireless fading communication channel. The method can further include receiving a second signal from the sensor node at the at least one anchor sensor of the plurality of anchor sensors during a first time period after the at least one anchor sensor transmitted the first signal. The method can also include determining for the at least one anchor sensor of the plurality of anchor sensors a time-of-arrival measurement based at least in part upon the first time period. In these or other embodiments, the method can further include determining a maximum likelihood estimation for the sensor node device, and/or providing a location estimation of the sensor node device based at least in part on the maximum likelihood estimation.

Still further embodiments include a method. The method can be implemented to localize a sensor node device configured to communicate with a plurality of anchor sensors each having a known location. The communication can occur over a wireless fading communication channel. The method includes receiving a first signal from at least one anchor sensor of the plurality of anchor sensors at the sensor node device over the wireless fading communication channel. The method can also include transmitting a second signal from the sensor node device to the at least one anchor sensor of the plurality of anchor sensors during a first time period after the first signal is transmitted. The transmitting the second signal can occur over the wireless fading communication channel after the receiving the first signal. The method can also include determining for the at least one anchor sensor of the plurality of anchor sensors a time-of-arrival measurement based at least in part upon the first time period. In these or other embodiments, the method can further include determining a maximum likelihood estimation for the sensor node device, and/or providing a location estimation of the sensor node device based at least in part on the maximum likelihood estimation.

Various embodiments include a wireless sensor network system. The wireless sensor network system can include a sensor node device. The wireless sensor network system can also include a plurality of anchor sensors each having a known location and in communication with the sensor node device over a wireless fading communication channel. The wireless sensor network system can further include a computer system comprising one or more processing modules and one or more non-transitory memory storage modules storing computer instructions configured to run on the one or more processing modules and perform certain acts. The computer instructions can perform the acts of receiving from each anchor sensor of the plurality of anchor sensors a time-of-arrival measurements. The computer instructions can also perform the acts of determining a maximum likelihood estimation for the sensor node device.

In other embodiments, the wireless sensor network system includes the sensor node device but not one, some, or all of the anchor sensors of the plurality of anchor sensors. Meanwhile, in still other embodiments, the wireless sensor network system includes one, some, or all of the anchor sensors of the plurality of anchor sensors but not the sensor node device.

Several embodiments include a method of providing a wireless sensor network system. The method can include providing a sensor node device. The method can further include providing a plurality of anchor sensors each having a known location and in communication with the sensor node device over a wireless fading communication channel. The method can also include providing a computer system comprising a computer video display, the computer system having non-transitory memory storing instructions that cause the computer system to perform certain acts. The instructions can cause the computer system to receive from each anchor sensor a time-of-arrival measurement. The instructions can further cause the computer system to determine a result from at least one of (a) a maximum likelihood estimation for the wireless fading communication channel, (b) a Cramer-Rao lower bound benchmark for a one-dimensional network, (c) a Cramer-Rao lower bound benchmark for a two-dimensional network, (d) a modified Cramer-Rao lower bound benchmark for a one-dimensional network, or (e) a modified Cramer-Rao lower bound benchmark for a two-dimensional network. The instructions can also cause the computer system to display the result at the computer video display.

In other embodiments, the method includes providing the sensor node device but not providing one, some, or all of the anchor sensors of the plurality of anchor sensors. Meanwhile, in still other embodiments, the method includes providing one, some, or all of the anchor sensors of the plurality of anchor sensors but not providing the sensor node device.

In order to assess the effects of different operating conditions on localization techniques, performance analyses can be carried out. These can include measuring the error in estimation and bounds on these performance errors when using different algorithms and/or when operating in different conditions, and under various constraints. With these studies, trade-offs in performance and complexity of implementation can be better understood.

In localization problems with sensor nodes at known locations, anchors transmit signals to (and receive signals from) sensor nodes at unknown locations, nodes, and use these transmissions or received signals to estimate the TOA, which leads to location estimation. In some embodiments, there can be a plurality of anchors in the wireless sensor network, and each anchor node can be in communication with the node at unknown location. In various embodiments, each of the plurality of anchors in communication with the node with unknown location can be each of a subset of the plurality of anchors in the wireless sensor network.

In embodiments having of WSN with M anchors and one node, the estimation can be based on TOA in the presence of fading channels. CRLB for localization error in the presence of fading can be derived under different scenarios. First, fading coefficients can be considered as unknown random parameters with a prior distribution. The maximum likelihood (ML) estimator for this case can also be derived. The CRLB on the variance of localization error can be derived by assuming Gaussian TOA measurements. Also, the CRLB in a multipath environment can be derived with TOA measurements. Additionally, the CRLB can be derived in a cooperative sensor network in the absence of fading. The variance of TOA measurements can be assumed to be a function of the distance between the node and the anchor, and the CRLB can be derived, and biased measurements can be considered. If the distribution of fading is unknown to the estimator then the modified CRLB (MCRLB) can be applied and shown to be equal to the CRLB in the absence of fading. This can be used to conclude that, in many embodiments, fading always deteriorates the performance of localization, and there is a loss of about 5 dB in CRLB due to Rayleigh fading.

Embodiments of methods for localization in the presence of fading are described herein. The fading coefficients can be considered as either unknown random parameters with a prior distribution or without any prior distribution known at the estimator. CRLBs are derived for both one dimensional (1-D) and two dimensional (2-D) localization problems with TOA measurements. The results are compared with the CRLBs in the absence of fading. The ML estimator in the presence of fading is derived. Also, the MCRLB in fading is shown to be equal to the CRLB in the additive white Gaussian noise (AWGN) case.

Localization in the Presence of Fading
System Model

A non-cooperative wireless sensor network can be provided, in which nodes do not communicate with each other, and which contains M anchors and N nodes in $R^n$, where n=1, 2. The vector $p=[p_1, p_2, \ldots, p_M]$ contains the cartesian coordinates of all anchors, and $z=[z_1, z_2, \ldots z_N]$ is the vector of node locations. In 1-D, the location of the $i^{th}$ anchor, $p_i=x_i$, and the $j^{th}$ node, $z_j=x_j$ are scalars. In 2-D, $p_i=[x_i, Y_i]^T$ and $z_j=[x_j, Y_j]^T$ are vectors. The network is noncooperative, so the CRLB on the variance of the location error for each node is independent of the other nodes. To simplify the analysis, in some embodiments, we consider only one node existing in the network at location z.

The node communicates with all anchors. Each anchor transmits a signal to a node, and the node sends back the signal immediately after receiving it. Each anchor measures the round-trip time and halves it to obtain the TOA estimates $\hat{\tau}_i$ between the $i^{th}$ anchor and the node. Using these values, the location of the node is estimated. FIG. 1 shows an example of a portion of a wireless sensor network system 100, including three anchors and one node, namely, anchor sensors 110, 120, and 130, and a sensor node device 140. Three anchors are present at positions $p=[p_1, p_2, p_3]$, and 1 node at the position $z=[x, y]^T$. Variables $\hat{\tau}_i$, $d_i$, and $h_i$ are the TOA measurement, distance, and the channel fading coefficient between the node and the $i^{th}$ anchor respectively, where $\hat{\tau}_i$ is the function of $d_i$ and $h_i$ in the presence of fading. The channels between anchors and the node are subject to additive noise and fading. In the absence of fading, the fading coefficients $h_i$ in FIG. 1 are set to 1. The distribution of $\hat{\tau}_i$ in this case is known to be $$\hat{\tau}_i \sim N\left(\frac{d_i}{c}, \sigma_T^2\right), \tag{1}$$

where $d_i$ is the true distance between the $i^{th}$ anchor and the node, which is denoted as $\|P_i-z\|_2$. Here, $\|\cdot\|_2$ is the Euclidean norm, c is the speed of propagation, and $\sigma_T^2$ is the variance of the TOA estimates on the channel.

In the presence of fading, the measurement $\hat{\tau}_i$ is a function of $d_i$ and $h_i$ (as shown in FIG. 1), and the following scenarios will be considered. First, fading coefficients are assumed to be random with a prior distribution known at the estimator. In this case, the unconditional distribution of the TOA measurements can be calculated by averaging across the fading to derive the CRLB. In the second scenario, fading coefficients are still considered as random parameters; however, the prior distribution is unknown to the estimator so that the fading effect in the previous scenario cannot be averaged out. In this case, the modified CRLB (MCRLB), which does not need the full knowledge of the fading distribution is derived.

Fading Coefficients as Random Parameters

Assume fading is not changing during all TOA measurements. Also, fading coefficients are random parameters with a prior Nakagami distribution. The TOA measurements $\hat{\tau}_i$ are assumed to be i.i.d. and conditioned on the fading coefficients satisfy $$\hat{\tau}_i \mid |h_i|^2 \sim N\left(\frac{d_i}{c}, \frac{\sigma_T^2}{|h_i|^2}\right), \tag{2}$$

where the fading power is Gamma distributed $$f_{|h_i|^2}(x) = m^m x^{m-1} \Gamma(m)^{-1} \exp(-mx), \tag{3}$$

where m is the fading parameter, and $E_{h_i}(|h_i|^2)$ is the average received power at the node and is fixed to 1. When m=1, the fading $|h_i|$ is Rayleigh distributed, and as $m \to \infty$, the channel exhibits no fading so that the AWGN dominates.

The unconditioned distribution of $\hat{\tau}_i$ can be calculated by using the formula $$f_{\hat{\tau}_i}(\hat{\tau}_i|z) = \int_0^\infty f(\hat{\tau}_i||h_i|^2, z) f_{|h_i|^2}(x) d|h_i|^2. \tag{4}$$

By substituting (2) and (3) into (4), and carrying out the integration we obtain $$f_{\hat{\tau}_i}(\hat{\tau}_i|z) = \frac{m^m \left(m - \frac{1}{2}\right)!}{2\sqrt{2\pi\sigma_T^2}\, \Gamma(m) \left[\frac{1}{2\sigma_T^2}\left(\hat{\tau}_i - \frac{d_i}{c}\right)^2 + m\right]^{(m+\frac{1}{2})}}. \tag{5}$$

Define the vector $h=[h_1, h_2, \ldots, h_M]$ containing all fading coefficients between the node and M anchors, and $T=[\hat{\tau}_1, \hat{\tau}_2, \ldots, \hat{\tau}_M]$ is the vector of TOA measurements. Also define $l(T|z) = \sum_{i=1}^{M} \ln f^{\hat{\tau}_i}(\hat{\tau}_i|z)$ as the log-likelihood function of $f(T|z)$, where $f(T|z) = \pi_{i=1}^{M} f_i(\hat{\tau}_i|z)$. Based on the log-likelihood, the CRLB can be expressed $$CRLB = \left[ E_T \left\{ \left[ \left( \frac{\partial l(T|z)}{\partial z} \right)^2 \right] \right\} \right]^{-1}. \quad (6)$$

For convenience, Let $l(\hat{\tau}_i|z) = \ln f^{\hat{\tau}_i}(\hat{\tau}_i|z)$ be the log likelihood function of each TOA measurement. Then the Fisher information matrix (FIM), $F_z$, of the node location in $R^n$ is denoted as $[F_z]_{jk} = f_{jk}$, and $$f_{jk} = \begin{cases} \sum_{i=1}^{M} E_{\hat{\tau}_i}\left[\left(\frac{\partial l(\hat{\tau}_i|z)}{\partial z_j}\right)^2\right] & j=k \\ -\sum_{i=1}^{M} E_{\hat{\tau}_i}\left[\frac{\partial^2 l(\hat{\tau}_i|z)}{\partial z_j \partial z_k}\right] & j \neq k \end{cases}. \quad (7)$$

In 1-D, the location of the node is $z=x$ and the distance between the node and the $i^{th}$ anchor is $d_i = \|x_i - x\|_2 = |x_i - x|$. Using $$F_z = \sum_{i=1}^{M} E^{\hat{\tau}_i}\left[\left(\frac{\partial l(\tau_i|z)}{\partial z}\right)^2\right],$$

$$E_{\hat{\tau}_i}\left[\left(\frac{\partial l(\hat{\tau}_i|z)}{\partial z}\right)^2\right] = \frac{m^m \left(m - \frac{1}{2}\right)!\left(m + \frac{1}{2}\right)^2}{\Gamma(m)\sqrt{2\pi} c^2 \sigma_T^5} X(d_i), \quad (8)$$

where $$X(d_i) = \int_0^\infty \frac{\left(\hat{\tau}_i - \frac{d_i}{c}\right)^2}{\left[\frac{1}{2\sigma_T^2}\left(\hat{\tau}_i - \frac{d_i}{c}\right)^2 + m\right]^{\frac{5}{2}+m}} d\hat{\tau}_i. \quad (9)$$

Unlike the AWGN case, the Fisher Information (FI) depends on $d_i$ through $X(d_i)$ in (9). However, it is possible to express it as $$X(d_i) \leq \frac{m^{-\frac{3}{2}+m} \sigma_T^3 \Gamma\left(\frac{3}{2}\right) \Gamma(m+1)}{\sqrt{2}\, \Gamma\left(m+\frac{5}{2}\right)} + \frac{\left(\frac{d_i}{c}\right)^2}{\left[\frac{1}{2\sigma_T^2}\left(\frac{d_i}{c}\right)^2 + m\right]^{\frac{5}{2}+m}}. \quad (10)$$

Since the second term in (10) is small ($d_i/c \approx 0$), it is clear that $X(d_i)$ can be approximated by the first term, and therefore approximately independent of d. Whether we use the term $X(d_i)$, or its approximation in (10), the CRLB in the presence of Nakagami fading is $$CRLB_{1-D}(z) = \frac{\Gamma(m)\sqrt{2\pi}\, c^2 \sigma_T^5}{m^m \left(m - \frac{1}{2}\right)!\left(m + \frac{1}{2}\right)^2 \sum_{i=1}^{M} X(d_i)}. \quad (11)$$

Using only the first term in (10), the loss due to fading can be expressed as $$\frac{CRLB_{1-D}(z)}{CRLB_{1-D}^{AWGN}} \approx k = \frac{\sqrt{\pi}\, \Gamma\left(m + \frac{5}{2}\right)}{\Gamma\left(\frac{3}{2}\right)\sqrt{2}\left(m + \frac{1}{2}\right)^2 \left(m - \frac{1}{2}\right)!}, \quad (12)$$

where we recall that $CRLB^{1-D^{AWGN}} = c^2 \sigma_T^2 / M$. When $m \to \infty$, the second term in (10) goes to 0 and k in (12) goes to 1 so that the CRLB in the presence of fading converges to the AWGN case.

When $m=1$, the fading is Rayleigh distributed, (17) is simplified as $$CRLB_{1-D}(z) = 9\left[8\sqrt{2}\, c^2 \sigma_T^5\right]^{-1} \left(\sum_{i=1}^{M} X(d_i)\right), \quad (13)$$

and $X(d_i)$ is $$X(d_i) = \left(\frac{d_i}{c}\right)^3 \left[\frac{\left(\frac{d_i}{c}\right)^2}{\sigma_T^2} + 5\right] \left[15\left[\frac{\left(\frac{d_i}{c}\right)^2}{2\sigma_T^2} + 1\right]^{5/2}\right]^{-1}. \quad (14)$$

Simplifying (13) for small $\sigma^{T^2}$ (high sound-to-noise ratio (SNR)), we obtain $$CRLB_{1-D}(z) = \frac{\sigma_T^2 c^2}{M} \frac{10}{3} + o(\sigma_T^2). \quad (15)$$

This shows that the loss in SNR due to Rayleigh fading is a factor of $$k \stackrel{\Delta}{=} \frac{10}{3},$$

which is about 5 dB.

In 2-D, the distance between the node and the $i^{th}$ anchor is $d_i = \sqrt{(x_i - x)^2 + (y_i - y)^2}$, and let $$Y(m) = m^m \left(m - \frac{1}{2}\right)!\left(m + \frac{1}{2}\right)^2 \left[\Gamma(m)\sqrt{2\pi c^2 \sigma}\, \frac{5}{T}\right]^{-1},$$

and the FIM is $$F_z = Y(m) \sum_{i=1}^{M} \begin{bmatrix} \frac{(x_i - x)^2 X(d_i)}{d_i^2} & \frac{(y_i - y)(x_i - x) X(d_i)}{d_i^2} \\ \frac{(y_i - y)(x_i - x) X(d_i)}{d_i^2} & \frac{(y_i - y)^2 X(d_i)}{d_i^2} \end{bmatrix}. \quad (16)$$

Therefore, the CRLB on the variance of the localization error in 2-D is $$CRLB_{2\text{-}D}(z) = tr(F_z^{-1}). \quad (17)$$

By comparing (17) with the CRLB in the absence of fading, both CRLBs in 2-D depend on the true location of the node. However, it is still possible to see that $CRLB_{2\text{-}D}$ is also a factor of k higher than the AWGN counterpart. Meanwhile, as m→∞, the CRLB in 2-D converges to the AWGN case as well.

The ML estimator for location estimation in the presence of fading is denoted as $$\hat{z} = \underset{z}{\arg\max} \prod_{i=1}^{M} f_{\hat{\tau}_i}(\hat{\tau}_i \mid z). \quad (18)$$

Substituting (5) into (18), we have $$\hat{z} = \underset{z}{\arg\min} \sum_{i=1}^{M} \log\left[\frac{1}{2\sigma_T^2}\left(\hat{\tau}_i - \frac{d_i}{c}\right)^2 + m\right]. \quad (19)$$

where $d_i = \|p_i - z\|^2$

In the absence of fading, the ML estimator is $$\hat{z} = \underset{z}{\arg\min} \sum_{i=1}^{M} \left(\hat{\tau}_i - \frac{d_i}{c}\right)^2. \quad (20)$$

We describe below that it is more appropriate to use (19) compared to (20) in the presence of fading.

Unknown Fading Distribution

Above, we assumed the fading is Nakagami distributed and the effect of fading is averaged out. However, in some cases the prior distribution of the fading is unknown to the estimator. In such cases, the modified CRLB (MCRLB), which is $$MCRLB(z) = \left[E_{T,h}\left\{\left[\left(\frac{\partial \ln f(T \mid h, z)}{\partial z}\right)^2\right]\right\}\right]^{-1} \quad (21)$$

can be applied.

When computing the CRLB above, the FIM uses the distribution in (5). For the MCRLB, from the PDF in (2), the FI can be calculated for the 1-D case as $$F_z = (c^2\sigma_T^2)^{-1} \sum_{i=1}^{M} E_{h_i}(|h_i|^2). \quad (22)$$

Therefore, (21) can be calculated as $$MCRLB_{1\text{-}D}(z) = c^2\sigma_T^2\left[\sum_{i=1}^{M} E_{h_i}(|h_i|^2)\right]^{-1}. \quad (23)$$

From (23) one can see that although the fading distribution is unknown at the estimator, the MCRLB of the localization error can be calculated if the second moment of fading is known. Since $E_{h_i}(|h_i|^2)=1$, then (23) can be simplified as $MCRLB_{1\text{-}D}(z) = c^2\sigma_T^2/M$, and the MCRLB for the localization error equals the AWGN case. Because the MCRLB is known to be a lower bound on the CRLB in (11) in the embodiments presented above, we can conclude that the presence of fading will always degrade performance of any fading distribution. For the MCRLB in 2-D, the derivation is very similar as 1-D, and it turns out the MCRLB in 2-D is the same as the 2-D AWGN case as well. The details are omitted for brevity.

Numerical Results

Figure 2:
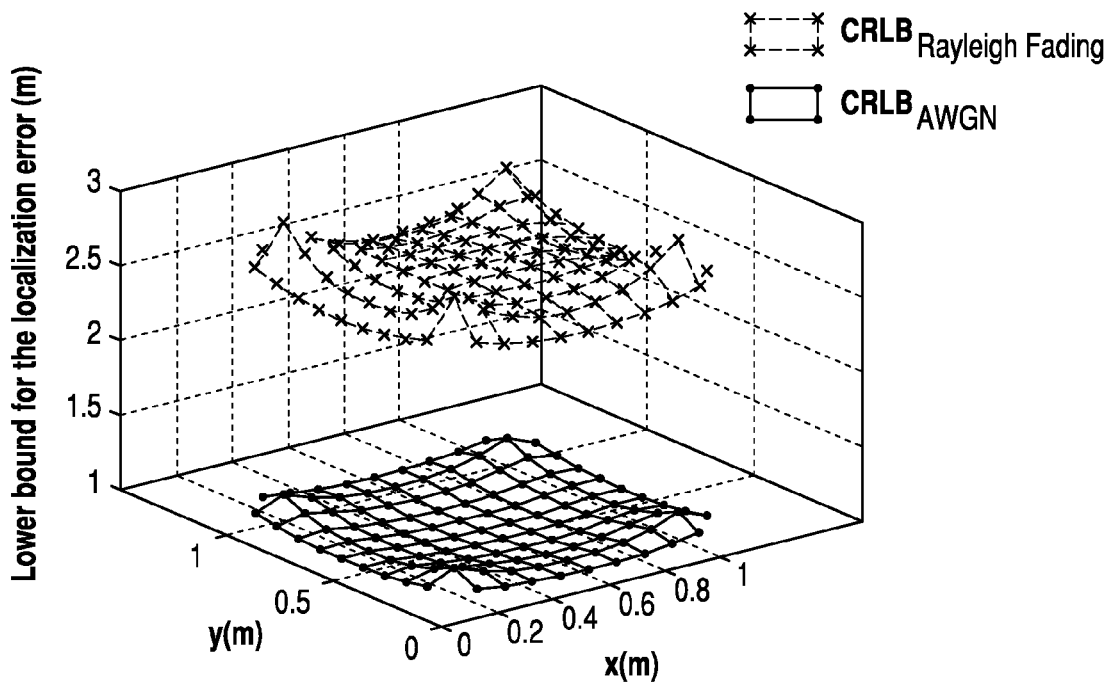
FIG. 2 illustrates a comparison of CRLB, showing the effect of fading.

Consider a sensor network with four anchors in the corner of a square, and one node within the square. The fading can be Rayleigh distributed. FIG. 2 shows a CRLB comparison in a 1 m×1 m square with $$\sigma_T = \frac{1}{c}.$$

In FIG. 2, we observe that the loss due to fading is about 2.5 everywhere within the square.

Figure 3:
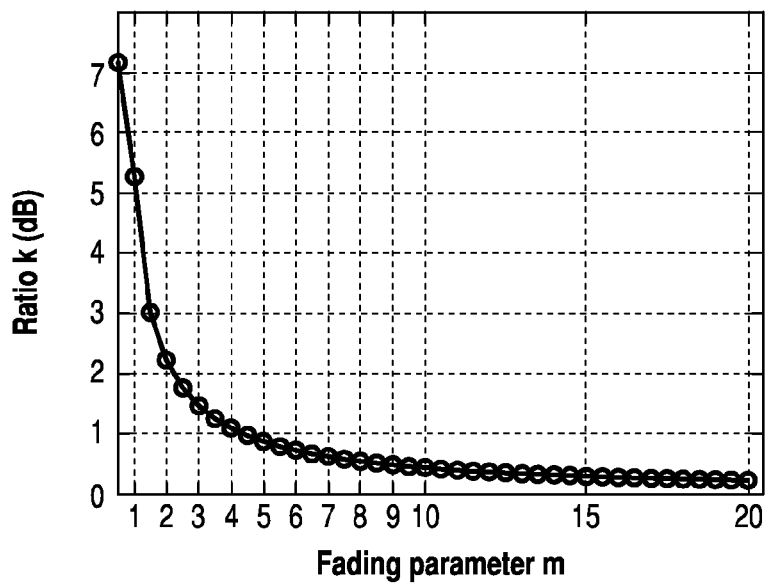
FIG. 3 illustrates the loss due to fading as a function of the Nakagami parameters.

FIG. 3 shows the ration k in (12) versus the Nakagami m parameter, which plots the loss due to fading as a function of the Nakagami m parameters. As expected, the loss decreases with increasing m and converges to 1.

Figure 4:
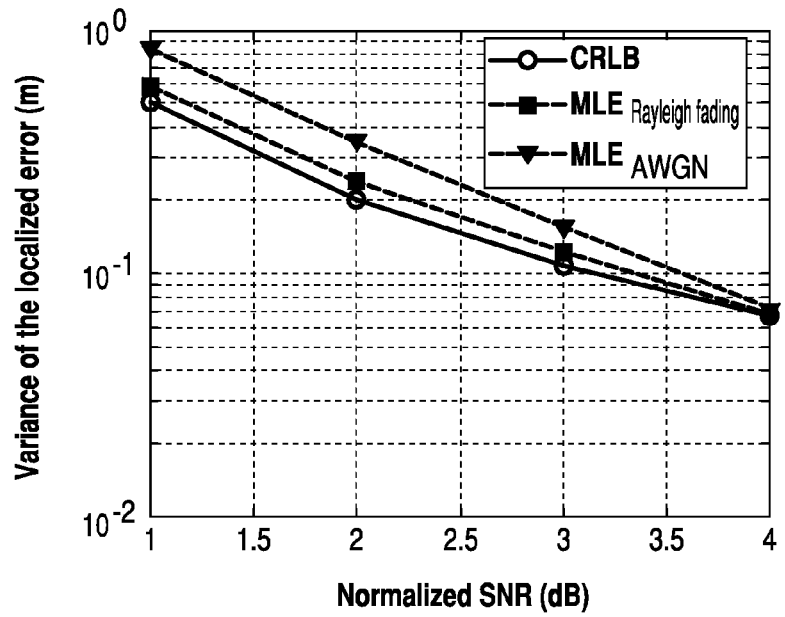
FIG. 4 illustrates a comparison of maximum likelihood estimators in the presence of fading.

In FIG. 4 we consider a 1m x 1m square, 4 anchors are in the corners, and 1 node is in the middle of the square. We compare ML estimators (19) and (20) both in the presence of fading by plotting the normalized SNR (with respect to $c^2$) versus the variance of localization error in FIG. 4. We observe that the fading ML estimator (19) performs better than the AWGN ML estimator (20) in the presence of fading.

Figure 5:
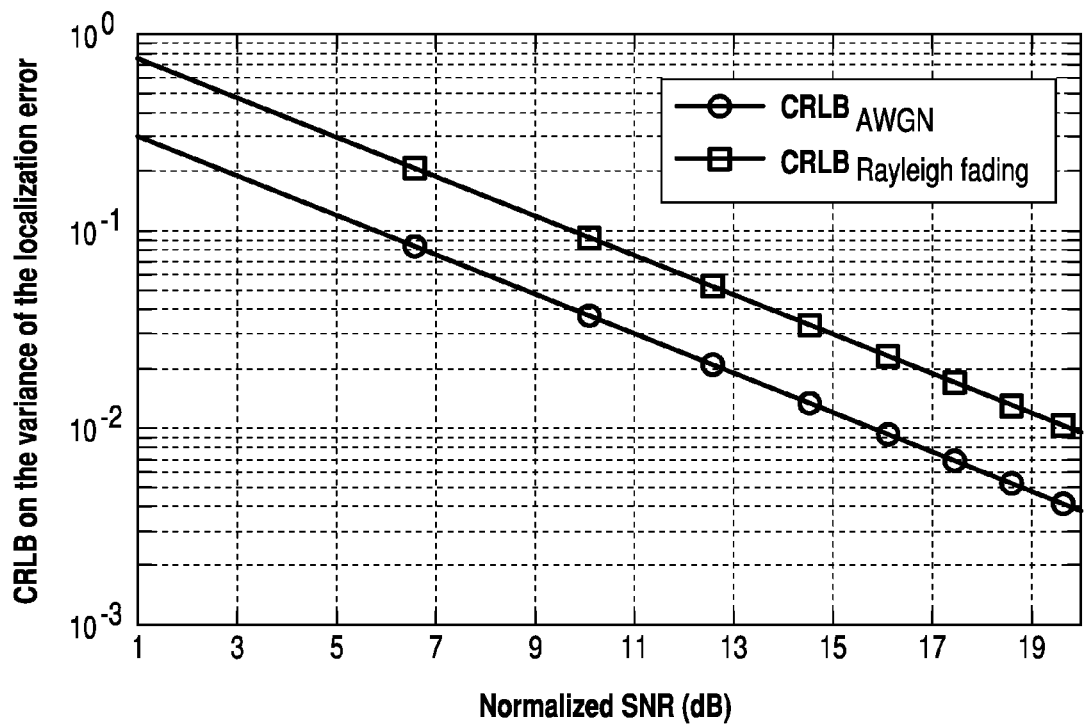
FIG. 5 illustrates a comparison of CRLB when the sound-to-noise ratio is high.

FIG. 5 shows the CRLB comparison in 1-D between the AWGN case and the presence of Rayleigh fading. From the figure one can see that in the high SNR regime, to maintain the same variance of localization error, CRLB in the presence of Rayleigh fading needs about 5 dB more power than the AWGN case.

CRLBs in the presence of fading under TOA measurements are thus derived. Fading coefficients are first considered as random parameters with a prior Nakagami distribution, the CRLB is derived by averaging out the effect of fading. Also, by comparing the CRLB in the presence of Rayleigh fading and the AWGN case, it is shown in both 1-D and 2-D there is a SNR loss of about 5 dB when the variance of noise is close to 0. Also, the CRLB in the presence of fading converges to the AWGN case as the fading parameter increases. Meanwhile, the ML estimator in the presence of fading is derived, and is different than the ML estimator for the AWGN case both theoretically and numerically. Second, the MCRLB is derived when the prior fading distribution is not known at the estimator, and the result is the MCRLB is the same as the CRLB in the absence of fading, proving that fading always leads to a loss in performance in the embodiments presented above.

An estimator for the location of a target in the presence of fading channels is thus described above. This estimator technique performs better than existing techniques. A benchmark measure based on a modified CRLB derivation in the presence of fading channels is also described above. This modified CRLB benchmark can be used in related work as a performance benchmark. In wireless communications, fading manifests as random gains applied to transmission over certain media. Fading can be observed for transmissions in most environments, when the transmission medium is air or vacuum. Since localization is carried out under these conditions, the method described can be used as a better alternative to approaches that are currently in use. The modified CRLB benchmark can also be used to measure performance.

For example, the estimator technique can be used in a cellular or wireless data telecommunications network, where base station receivers are known anchors and devices, such as mobile phones, are nodes with an unknown location. The telecommunications network can include small-scale fading, in which high frequency signals reflect off obstacles to create constructive and destructive interference. In such small-scale fading environment, movements of a device a distance of 5 to 10 centimeters (cm) can result in a change in the fading of the signal. The location of such a device can be estimated with the ML estimator. The ML estimator described can thus beneficially provide estimated device location to facilitate location-based applications.

Figure 6:
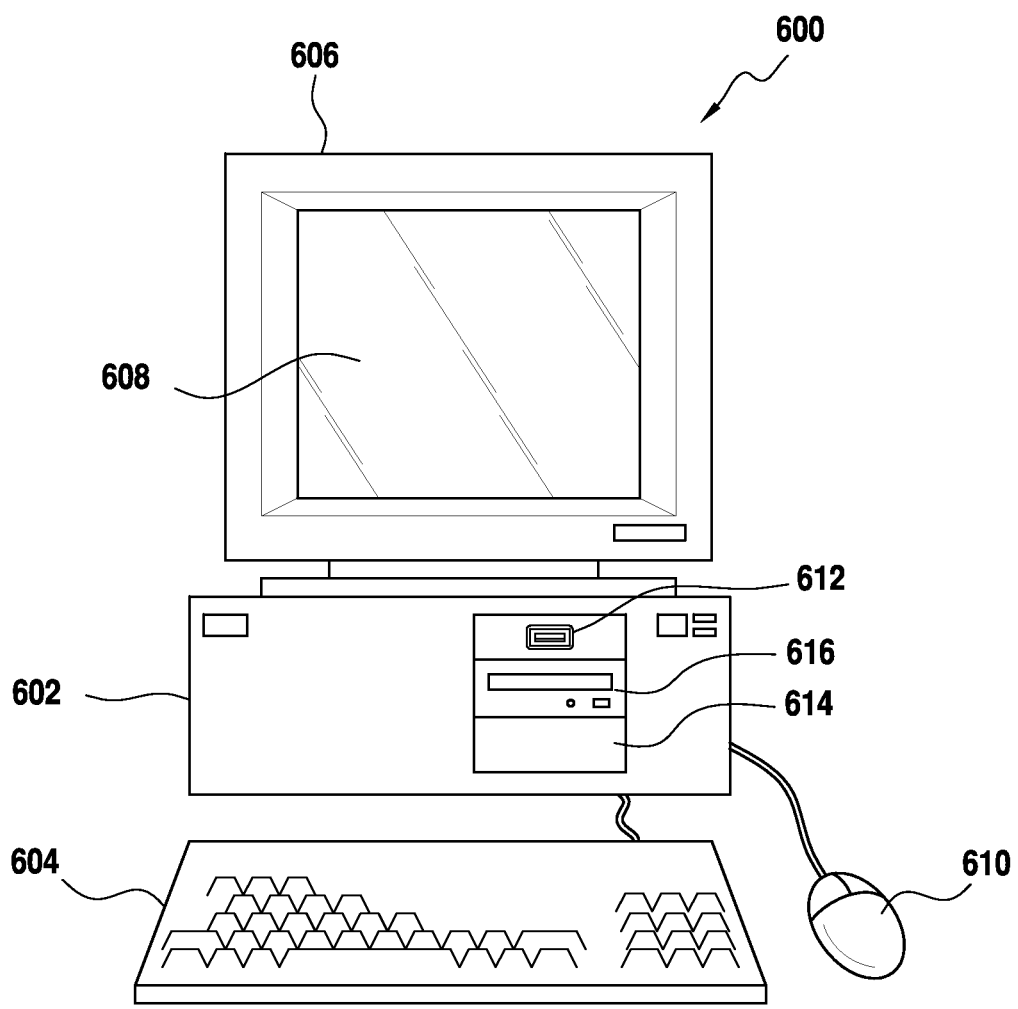
FIG. 6 illustrates a computer system that is suitable for implementing an embodiment of the method shown in FIG. 8.
Figure 7:
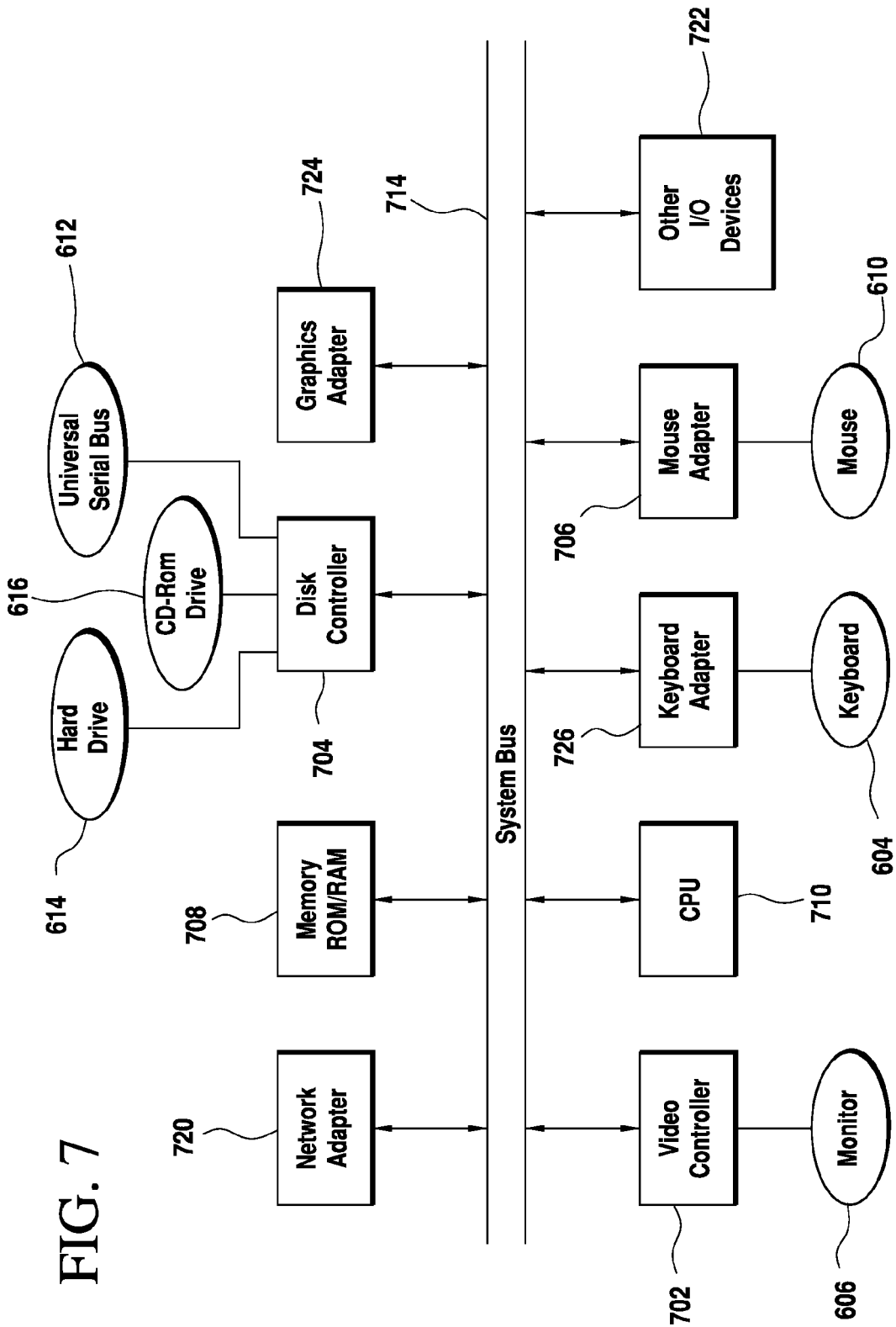
FIG. 7 illustrates a representative block diagram of an example of the elements included in the circuit boards inside a chassis of the computer system of FIG. 6.

Turning again to the next drawing, FIG. 6 illustrates an exemplary embodiment of computer sytstem 600, all of which or a portion of which can be suitable for implementing the techniques described above. As an example, a different or separate one of chassis 602 (and its internal components) can be suitable for implementing the techniques described above. Furthermore, one or more elements of computer sytstem 600 (e.g., refreshing monitor 606, keyboard 604, and/or mouse 610, etc.) can also be appropriate for implementing the techniques described above. Computer sytstem 600 comprises chassis 602 containing one or more circuit boards (not shown), Universal Serial Bus (USB) port 612, Compact Disc Read-Only Memory (CD-ROM) and/or Digital Video Disc (DVD) drive 616, and hard drive 614. A representative block diagram of the elements included on the circuit boards inside chassis 602 is shown in FIG. 7. Central processing unit (CPU) 710 in FIG. 7 is coupled to system bus 714 in FIG. 7. In various embodiments, the architecture of CPU 710 can be compliant with any of a variety of commercially distributed architecture families.

Continuing with FIG. 7, system bus 714 also is coupled to memory storage unit 708, where memory storage unit 708 comprises both read only memory (ROM) and random access memory (RAM). Non-volatile portions of memory storage unit 708 or the ROM can be encoded with a boot code sequence suitable for restoring computer sytstem 600 (FIG. 6) to a functional state after a system reset. In addition, memory storage unit 708 can comprise microcode such as a Basic Input-Output System (BIOS). In some examples, the one or more memory storage units of the various embodiments disclosed herein can comprise memory storage unit 708, a USB-equipped electronic device, such as, an external memory storage unit (not shown) coupled to universal serial bus (USB) port 612 (FIGS. 6-7), hard drive 614 (FIGS. 6-7), and/or CD-ROM or DVD drive 616 (FIGS. 6-7). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 710.

In the depicted embodiment of FIG. 7, various I/O devices such as disk controller 704, graphics adapter 724, video controller 702, keyboard adapter 726, mouse adapter 706, network adapter 720, and other I/O devices 722 can be coupled to system bus 714. Keyboard adapter 726 and mouse adapter 706 are coupled to keyboard 604 (FIGS. 6-7) and mouse 610 (FIGS. 6-7), respectively, of computer sytstem 600 (FIG. 6). While graphics adapter 724 and video controller 702 are indicated as distinct units in FIG. 7, video controller 702 can be integrated into graphics adapter 724, or vice versa in other embodiments. Video controller 702 is suitable for refreshing monitor 606 (FIGS. 6-7) to display images on a screen 608 (FIG. 6) of computer sytstem 600 (FIG. 6). Disk controller 704 can control hard drive 614 (FIGS. 6-7), USB port 612 (FIGS. 6-7), and CD-ROM drive 616 (FIGS. 6-7). In other embodiments, distinct units can be used to control each of these devices separately.

In some embodiments, network adapter 720 can comprise and/or be implemented as a WNIC (wireless network interface controller) card (not shown) plugged or coupled to an expansion port (not shown) in computer sytstem 600 (FIG. 6). In other embodiments, the WNIC card can be a wireless network card built into computer sytstem 600 (FIG. 6). A wireless network adapter can be built into computer sytstem 600 by having wireless communication capabilities integrated into the motherboard chipset (not shown), or implemented via one or more dedicated wireless communication chips (not shown), connected through a PCI (peripheral component interconnector) or a PCI express bus of computer sytstem 600 (FIG. 6) or USB port 612 (FIG. 6). In other embodiments, network adapter 720 can comprise and/or be implemented as a wired network interface controller card (not shown).

Although many other components of computer sytstem 600 (FIG. 6) are not shown, such components and their interconnection are well known to those of ordinary skill in the art. Accordingly, further details concerning the construction and composition of computer sytstem 600 and the circuit boards inside chassis 602 (FIG. 6) are not discussed herein.

When computer sytstem 600 in FIG. 6 is running, program instructions stored on a USB-equipped electronic device connected to USB port 612, on a CD-ROM or DVD in CD-ROM and/or DVD drive 616, on hard drive 614, or in memory storage unit 708 (FIG. 7) are executed by CPU 710 (FIG. 7). A portion of the program instructions, stored on these devices, can be suitable for carrying out at least part of the techniques described above.

Although computer sytstem 600 is illustrated as a desktop computer in FIG. 6, there can be examples where computer sytstem 600 may take a different form factor while still having functional elements similar to those described for computer sytstem 600. In some embodiments, computer sytstem 600 may comprise a single computer, a single server, or a cluster or collection of computers or servers, or a cloud of computers or servers. Typically, a cluster or collection of servers can be used when the demand on computer sytstem 600 exceeds the reasonable capability of a single server or computer. In certain embodiments, computer sytstem 600 may comprise a portable computer, such as a laptop computer. In certain other embodiments, computer sytstem 600 may comprise a mobile device, such as a smart phone. In certain additional embodiments, computer sytstem 600 may comprise an embedded system.

In still other embodiments, all or a portion of the techniques described above can be implemented by a transceiver system (e.g., software radio board).

Figure 8:
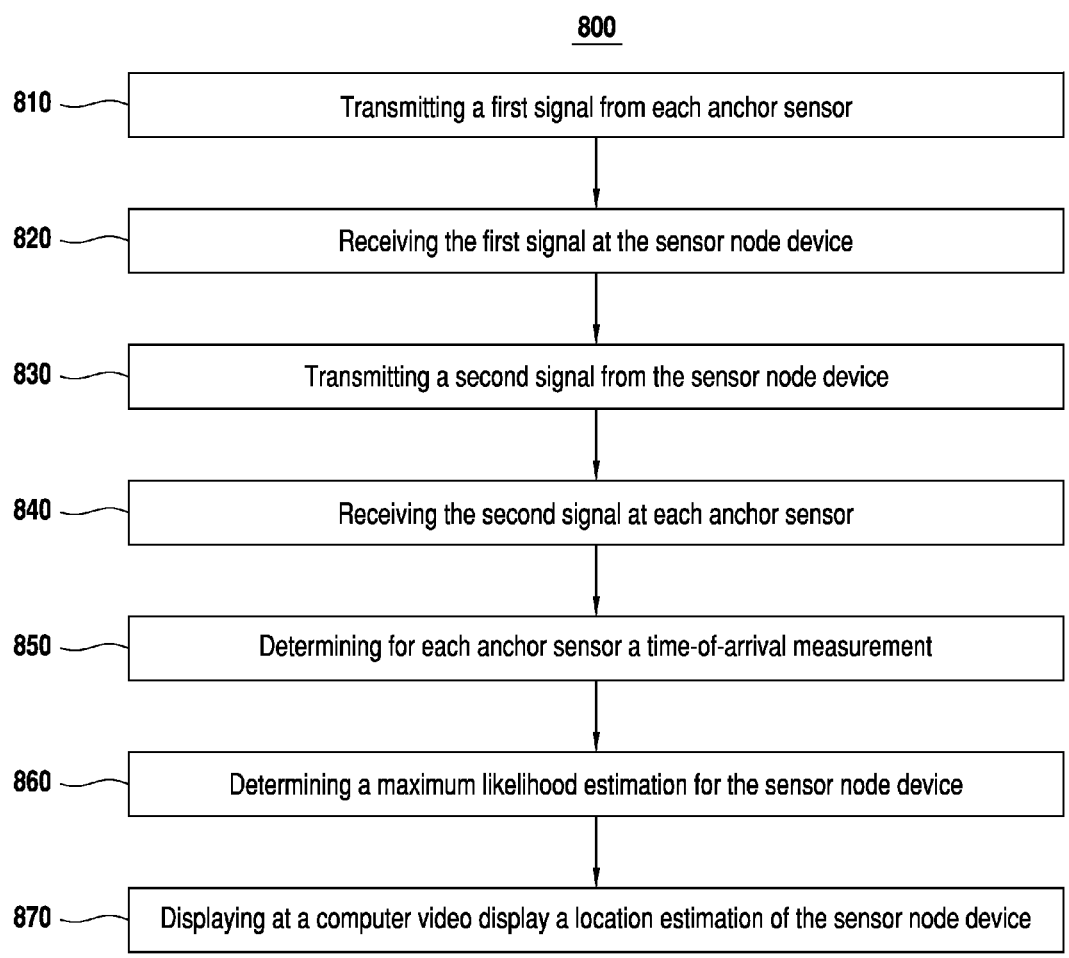
FIG. 8 illustrates a flowchart for a method of localizing a sensor node device, according to an embodiment.

Turning ahead in the drawings, FIG. 8 illustrates a flow chart for a method 800 of localizing a sensor node device in communication with a plurality of anchor sensors having a known location, in which the communication occurs over a wireless fading communication channel, according to an embodiment. Method 800 is merely exemplary and is not limited to the embodiments presented herein. Method 800 can be employed in many different embodiments or examples not specifically depicted or described herein. In some embodiments, the procedures, the processes, and/or the activities of method 800 can be performed in the order presented. In other embodiments, the procedures, the processes, and/or the activities of method 800 can be performed in any suitable order. In still other embodiments, one or more of the procedures, the processes, and/or the activities of method 800 can be combined or skipped. In some embodiments, method 800 can be implemented by sensor node 140 (FIG. 1), anchor sensors 110, 120, 130 (FIG. 1), and/or computer sytstem 600 (FIG. 6).

Referring to FIG. 8, in some embodiments method 800 can include block 810 of transmitting a first signal from each anchor sensor of the plurality of anchor sensors to the sensor node device over the wireless fading communication channel. For example, anchor sensors 110, 120, and 130 (FIG. 1) can transmit a first signal over the wireless fading communication channel to sensor node device 140 (FIG. 1).

Method 800 also can include block 820 of receiving the first signal at the sensor node device. For example, sensor node device 140 (FIG. 1) can receive the first signal sent from each of anchor sensors 110, 120, and 130 (FIG. 1) in block 810.

Method 800 also can include block 830 of transmitting a second signal from the sensor node device to each anchor sensor of the plurality of anchor sensors. In many embodiments, the transmitting of the second signal occurs over the wireless fading communication channel after receipt of the first signal. In a number of embodiments, the sensor node device transmits the second signal immediately after receiving the first signal. For example, sensor node device 140 (FIG. 1) can receive a first signal sent from anchor sensor 110 (FIG. 1) and immediately transmit a second signal to anchor sensor 110 (FIG. 1). Similarly, immediately upon receiving a first signal sent from anchor sensor 120 (FIG. 1) and/or a first signal sent from anchor sensor 130 (FIG. 1), sensor node device 140 (FIG. 1) can transmit a second signal to anchor sensor 120 (FIG. 1) and/or anchor sensor 130 (FIG. 1), respectively.

Method 800 also can include block 840 of receiving the second signal at each anchor sensor of the plurality of anchor sensors during a first time period after such anchor sensor transmitted the first signal. For example, each of anchor sensors 110, 120, and 130 (FIG. 1) can receive the second signal sent by sensor node device 140 (FIG. 1) to the respective anchor sensor (110, 120, or 130 (FIG. 1)) in block 830 during a first time period after which the respective anchor sensor (110, 120, or 130 (FIG. 1)) sent the first signal to sensor node device 140 (FIG. 1) in block 810.

Method 800 also can include block 850 of determining for each anchor sensor of the plurality of anchor sensors a time-of-arrival measurement. In many embodiments, determining the time-of-arrive measurement can be based at least in part upon the first time period. For example, anchor sensor 110 (FIG. 1) can measure the first time period of block 840 from the time it sent the first signal to sensor node device 140 (FIG. 1) in block 810 until it received the second signal from sensor node device 140 (FIG. 1) in block 840, and it can half that round-trip time to determine a time-of-arrive measurement at anchor sensor 110 (FIG. 1). Similarly, anchor sensor 120 (FIG. 1) and/or anchor sensor 130 (FIG. 1) can each determine the time-of-arrival measurement at anchor sensor 120 (FIG. 1) and/or anchor sensor 130 (FIG. 1), respectively, based at least in part upon the first time period.

Method 800 also can include a block 860 of determining a maximum likelihood estimation for the sensor node device. For example, computer system 600 (FIG. 6) can use the time-of-arrival measurements determined in block 850 by each anchor sensor (e.g., 110, 120, 130 (FIG. 1)), to determine a maximum likelihood estimation for sensor node device 140 (FIG. 1). In many embodiments, computer sytstem 600 (FIG. 6) can use equation (19) described above to determine the maximum likelihood estimation of sensor node device 140 (FIG. 1).

Method 800 also can include a block 870 of displaying at a computer video display a location estimation of the sensor node device based at least in part on the maximum likelihood estimation. For example, computer sytstem 600 (FIG. 6) can display on screen 608 (FIG. 6) a location estimation of sensor node device 140 (FIG. 1) that is based at least in part on the maximum likelihood estimation determined in block 860.

Figure 9:
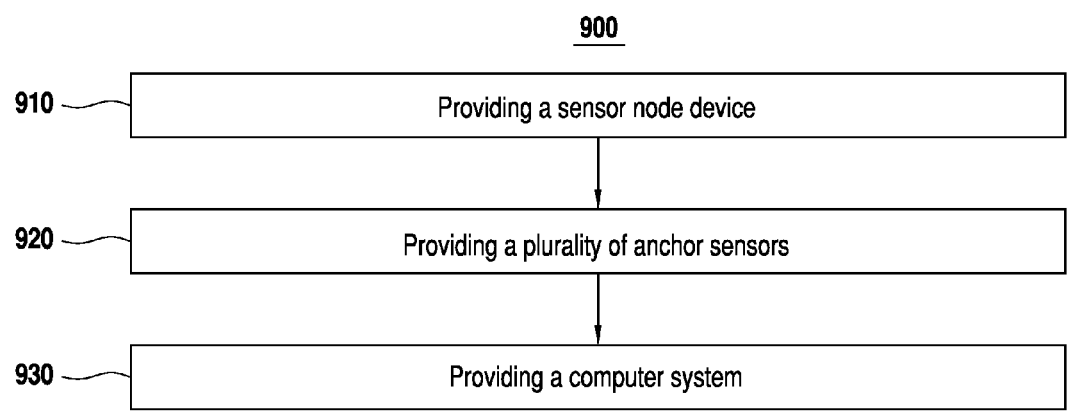
FIG. 9 illustrates a flowchart for a method of providing a wireless sensor network system, according to an embodiment.

Turning ahead in the drawings, FIG. 9 illustrates a flow chart for a method 900 of providing a wireless sensor network system, according to an embodiment. Method 900 is merely exemplary and is not limited to the embodiments presented herein. Method 900 can be employed in many different embodiments or examples not specifically depicted or described herein. In some embodiments, the procedures, the processes, and/or the activities of method 900 can be performed in the order presented. In other embodiments, the procedures, the processes, and/or the activities of method 900 can be performed in any suitable order. In still other embodiments, one or more of the procedures, the processes, and/or the activities of method 900 can be combined or skipped. In some embodiments, the wireless sensor network system provided in method 900 can be identical or similar to wireless sensor network system 100 (FIG. 1).

Referring to FIG. 9, in some embodiments method 900 can include block 910 of providing a sensor node device. In many embodiments, the sensor node device can be identical or similar to sensor node device 140 (FIG. 1).

Method 900 also can include block 920 of providing a plurality of anchor sensors. In a number of embodiments, the plurality of anchor sensors can be identical or similar to anchor sensors 110, 120, and 130 (FIG. 1). In several embodiments, each anchor sensor of the plurality of anchor sensors can have a known location and can be in communication with the sensor node device over a wireless fading communication channel.

Method 900 also can include block 930 of providing a computer system. In various embodiments, the computer system can be identical or similar to computer sytstem 600 (FIG. 6), and/or can be integral with one or more of the anchor sensors and/or the sensor node device. The computer system can include one or more processing modules, one or more non-transitory memory storage modules, and/or a computer video display. The non-transitory memory storage modules can store computer instructions configured to run on the processing modules and perform certain acts. In some embodiments, the computer instructions cause the computer system to receive from each anchor sensor a time-of-arrival measurement. In a number of embodiments, the computer instructions cause the computer system to determine a result from at least one of (a) a maximum likelihood estimation for the wireless fading communication channel, (b) a Cramer-Rao lower bound benchmark for a one-dimensional network, (c) a Cramer-Rao lower bound benchmark for a two-dimensional network, (d) a modified Cramer-Rao lower bound benchmark for a one-dimensional network, or (e) a modified Cramer-Rao lower bound benchmark for a two-dimensional network. In some embodiments, the computer instructions cause the computer system to display the result at the computer video display.

Although maximum likelihood localization in the presence of channel uncertainties has been described with reference to specific embodiments, it will be understood by those skilled in the art that various changes may be made without departing from the spirit or scope of the invention. Accordingly, the disclosure of embodiments of maximum likelihood localization in the presence of channel uncertainties is intended to be illustrative of the scope of the invention and is not intended to be limiting. It is intended that the scope of the invention shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of localizing a sensor node device in communication with a plurality of anchor sensors each having a known location, the communication occurring over a wireless fading communication channel, the method comprising:
transmitting a first signal from each anchor sensor of the plurality of anchor sensors to the sensor node device over the wireless fading communication channel;
receiving the first signal at the sensor node device;
transmitting a second signal from the sensor node device to each anchor sensor of the plurality of anchor sensors, wherein the transmitting occurs over the wireless fading communication channel after receipt of the first signal;
receiving the second signal at each anchor sensor of the plurality of anchor sensors during a first time period after such anchor sensor transmitted the first signal;
determining for each anchor sensor of the plurality of anchor sensors a time-of-arrival measurement based at least in part upon the first time period;
determining a maximum likelihood estimation for the sensor node device communicating over the wireless fading communication channel, the maximum likelihood estimation comprising a fading parameter for the wireless fading communication channel; and
displaying at a computer video display a location estimation of the sensor node device based at least in part on the maximum likelihood estimation,
wherein:
determining the maximum likelihood estimation for the sensor node device communicating over the wireless fading communication channel comprises computing a maximum likelihood estimator $\hat{z}$ as follows:

$$\hat{z} = \underset{z}{\operatorname{argmin}} \sum_{i=1}^{M} \log\left[\frac{1}{2\sigma_T^2}\left(\hat{\tau}_i - \frac{d_i}{c}\right)^2 + m\right],$$

where a true distance $d_i$ between an $i^{th}$ anchor sensor of the plurality of anchor sensors and the sensor node device is denoted as $d_i = \|p_i - z\|_2$, $p_i$ represents cartesian coordinates of the $i^{th}$ anchor sensor of the plurality of anchor sensors, M represents a quantity of the plurality of anchor sensors, z represents cartesian coordinates of the sensor node device, $\hat{\tau}_i$ represents the time-of-arrival measurement for the $i^{th}$ anchor sensor of the plurality of anchor sensors, c is a speed of propagation, $\sigma_T^2$ is a variance of the time-of-arrival measurements, and m is the fading parameter for the wireless fading communication channel.

2. The method of claim 1 further comprising:
determining a Cramer-Rao lower bound benchmark for a one-dimensional network involving communication over the wireless fading communication channel.

3. The method of claim 1 further comprising:
determining a Cramer-Rao lower bound benchmark for a two-dimensional network involving communication over the wireless fading communication channel.

4. The method of claim 1 further comprising:
determining a modified Cramer-Rao lower bound benchmark for a one-dimensional network involving communication over the wireless fading communication channel.

5. The method of claim 1 further comprising:
determining a modified Cramer-Rao lower bound benchmark for a two-dimensional network involving communication over the wireless fading communication channel.

6. The method of claim 1, wherein:
the wireless fading communication channel comprises a small-scale fading environment, such that a fading of at least one of the first signal or the second signal changes by moving the sensor node device a distance of approximately 5 cm to approximately 10 cm.

7. The method of claim 1, wherein:
at least one of the plurality of anchor sensors comprises a base station in a cellular or wireless data telecommunications network; and
the sensor node device comprises a mobile phone.

8. A wireless sensor network system comprising:
a sensor node device;
a plurality of anchor sensors each having a known location and in communication with the sensor node device over a wireless fading communication channel; and
a computer system comprising one or more processing modules and one or more non-transitory memory storage modules storing computer instructions configured to run on the one or more processing modules and perform the acts of:
receiving from each anchor sensor of the plurality of anchor sensors a time-of-arrival measurement; and
determining a maximum likelihood estimation for the sensor node device communicating over the wireless fading communication channel, the maximum likelihood estimation comprising a fading parameter for the wireless fading communication channel,
wherein the computer instructions are further configured such that:
determining the maximum likelihood estimation for the sensor node device communicating over the wireless fading communication channel comprises computing a maximum likelihood estimator $\hat{z}$ as follows:

$$\hat{z} = \operatorname*{argmin}_{z} \sum_{i=1}^{M} \log\left[\frac{1}{2\sigma_T^2}\left(\hat{\tau}_i - \frac{d_i}{c}\right)^2 + m\right],$$

where a true distance $d_i$ between an $i^{th}$ anchor sensor of the plurality of anchor sensors and the sensor node device is denoted as $d_i = \|p_i - z\|_2$, $p_i$ represents cartesian coordinates of the $i^{th}$ anchor sensor of the plurality of anchor sensors, M represents a quantity of the plurality of anchor sensors, z represents cartesian coordinates of the sensor node device, $\hat{\tau}_i$ represents the time-of-arrival measurement for the $i^{th}$ anchor sensor of the plurality of anchor sensors, c is a speed of propagation, $\sigma_T^2$ is a variance of the time-of-arrival measurements, and m is the fading parameter for the wireless fading communication channel.

9. The wireless sensor network system of claim 8, wherein:
the computer system further comprises a computer video display; and
the computer instructions are further configured to cause the computer system to display the maximum likelihood estimation at the computer video display.

10. The wireless sensor network system of claim 8, wherein the computer instructions are further configured to perform the act of:
determining a Cramer-Rao lower bound benchmark for a one-dimensional network involving communication over the wireless fading communication channel.

11. The wireless sensor network system of claim 8, wherein the computer instructions are further configured to perform the act of:
determining a Cramer-Rao lower bound benchmark for a two-dimensional network involving communication over the wireless fading communication channel.

12. The wireless sensor network system of claim 8, wherein the computer instructions are further configured to perform the act of:
determining a modified Cramer-Rao lower bound benchmark for a one-dimensional network involving communication over the wireless fading communication channel.

13. The wireless sensor network system of claim 8, wherein the computer instructions are further configured to perform the act of:
determining a modified Cramer-Rao lower bound benchmark for a two-dimensional network involving communication over the wireless fading communication channel.

14. The wireless sensor network system of claim 8, wherein:
the wireless fading communication channel comprises a small-scale fading environment, such that a fading of at least one of a first signal or a second signal changes by moving the sensor node device a distance of approximately 5 cm to approximately 10 cm.

15. The wireless sensor network system of claim 8, wherein:
at least one of the plurality of anchor sensors comprises a base station in a cellular or wireless data telecommunications network; and
the sensor node device comprises a mobile phone.

16. A method of providing a wireless sensor network system comprising:
providing a sensor node device;
providing a plurality of anchor sensors each having a known location and in communication with the sensor node device over a wireless fading communication channel; and
providing a computer system comprising a computer video display, the computer system having non-transitory memory storing instructions that cause the computer system to:
receive from each anchor sensor a time-of-arrival measurement;
determine a maximum likelihood estimation for the sensor node device communicating over the wireless fading communication channel by computing a maximum likelihood estimator $\hat{z}$ as follows:

$$\hat{z} = \operatorname*{argmin}_{z} \sum_{i=1}^{M} \log\left[\frac{1}{2\sigma_T^2}\left(\hat{\tau}_i - \frac{d_i}{c}\right)^2 + m\right],$$

where a true distance $d_i$ between an $i^{th}$ anchor sensor of the plurality of anchor sensors and the sensor node device is denoted as $d_i = \|p_i - z\|_2$, $p_i$ represents cartesian coordinates of the $i^{th}$ anchor sensor of the plurality of anchor sensors, M represents a quantity of the plurality of anchor sensors, z represents cartesian coordinates of the sensor node device, $\hat{\tau}_i$ represents the time-of-arrival measurement for the $i^{th}$ anchor sensor of the plurality of anchor sensors, c is a speed of propagation, $\sigma_T^2$ is a variance of the time-of-arrival measurements, and m is a fading parameter for the wireless fading communication channel; and display at the computer video display a location estimation of the sensor node device based at least in part on the maximum likelihood estimation, the maximum likelihood estimation comprising the fading parameter for the wireless fading communication channel.

17. The method of claim 16, wherein the instructions further cause the computer system to:
determine a modified Cramer-Rao lower bound benchmark for a one-dimensional network involving communication over the wireless fading communication channel.

18. The method of claim 16, wherein the instructions further cause the computer system to:
determine a modified Cramer-Rao lower bound benchmark for a two-dimensional network involving communication over the wireless fading communication channel.

19. The method of claim 16, wherein the instructions further cause the computer system to:
determine a Cramer-Rao lower bound benchmark for a one-dimensional network involving communication over the wireless fading communication channel.

20. The method of claim 16, wherein the instructions further cause the computer system to:
determine a Cramer-Rao lower bound benchmark for a two-dimensional network involving communication over the wireless fading communication channel.

* * * * *